April 7, 1953     G. A. TINNERMAN     2,633,886

NUT ANCHORING DEVICE

Original Filed May 22, 1947

Inventor
George A. Tinnerman,
By H. G. Lombard
Attorney

Patented Apr. 7, 1953

2,633,886

UNITED STATES PATENT OFFICE 2,633,886

NUT ANCHORING DEVICE

George A. Tinnerman, Cleveland, Ohio, assignor to Tinnerman Products, Inc., Cleveland, Ohio, a corporation of Ohio Original application May 22, 1947, Serial No. 749,757. Divided and this application April 6, 1951, Serial No. 219,642

10 Claims. (Cl. 151—41.75)

This invention relates in general to nut fastened installations and deals, more particularly, with improvements in nut holding devices for attaching standard nuts, tapped plates, and the like, in fastening position in an assembly prior to the application of a cooperating bolt or similar fastener thereto for securing the parts of the installation. This application is a division of prior copending application Serial Number 749,757 filed May 22, 1947 and now Patent 2,552,499 issued May 8, 1952.

In many assemblies, it is necessary or desirable to use a standard nut and bolt fastening means but it is usually a difficult problem, especially in blind locations, for the operator to hold the nut in place as the bolt is applied, or otherwise, to maintain the nut against rotation during the final tightening of the bolt therewith. In most assemblies in which the rearward side of a part is not conveniently or readily accessible for holding a nut in fastening position prior to application of the bolt, it is necessary to resort to some form of riveting, welding or other attaching means for retaining the nut in fastening position.

In the average installation requiring a cheap, inexpensive nut holding means, the cost of welding, or riveting clinch-on nut holding devices, and the like, generally is so expensive as to make the use thereof prohibitive. Similarly, sheet metal, cage type of nut holding devices heretofore available are objectionably expensive and complicated, and otherwise disadvantageous in requiring an entirely inordinate amount of time for attaching the same in fastening position in an installation.

A primary object of the present invention, therefore, is to provide an improved sheet metal nut holder or retainer which is relatively simple and inexpensive to manufacture and includes in its construction a simplified, easily and quickly applied clip type of attaching means in the form of a pair of cooperating spring arms adapted to clasp a part adjacent a bolt opening therein to hold the nut in attached fastening position over said bolt opening, together with an auxiliary supporting hook adapted to engage a marginal portion of the bolt opening to reinforce and rigidify the nut holder in such attached fastening position.

A further object of the invention is to provide a nut holder of this character comprising a pair of arms for embracing the apertured part to which the nut is to be attached, together with means on one of said arms adapted to lock the nut holder in attached fastening position in conjunction with the said auxiliary supporting hook.

Another object of the invention is to provide a nut holder such as described in which the locking means on one of the arms of the nut holder is designed to serve also as a locating or positioning element for guiding the nut holder in the application thereof to attached fastening position.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

Generally speaking, a nut holder constructed in accordance with the present invention is best provided from any suitable sheet metal strip material, preferably tempered spring metal or cold rolled metal having spring-like characteristics. The nut holding portion of the device may be provided in various forms to accommodate any selected type of nut together with an improved attaching means including an attaching arm, or the like, and an auxiliary supporting hook. Preferably the attaching arm is provided with a locking detent serving as an indexing or positioning means together with an adjacent sight opening which advantageously facilitates application of the nut holder to the attached fastening position of the nut carried thereby.

Figure 1:
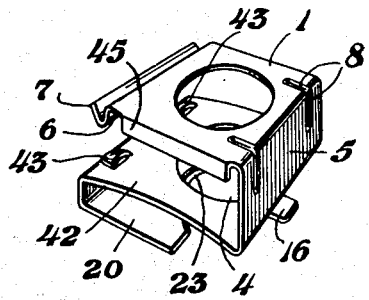
Fig. 1 is a perspective view of one form of the improved nut holder wherein the nut retaining means includes an arched nut supporting arm or base that serves as a spring lock washer for the nut; and, Fig. 2 is a sectional view showing the application and use of the nut holder of Fig. 1 in a completed installation.

Referring now, more particularly, to the drawings, Fig. 1 shows one form of the improved nut holder in which a sheet metal strip is bent into a substantial S-shape to define a pair of cooperating nut holding arms comprising a top arm 1 and an intermediate arm or base 42 having a bolt passage 4 aligned with a similar bolt passage in said top arm 1. Said nut holding arms 1, 42, are spaced by a connecting portion or web 5 and are designed to hold, in frictionally and grippingly assembled relation therebetween, any selected form of nut N, Fig. 2.

In the present example, a standard square nut N is shown retained in clamped relation between the arms 1, 42, and is held against endwise displacement or removal from between said arms by a downwardly bent end flange or shoulder 6 engaging the adjacent outer end face of the nut N. Preferably an upwardly flared tongue or guide surface 7 is provided on the extremity of said arm 1 in order to facilitate the initial application of the nut to clamped relation between said arms 1, 42, as aforesaid. In order to rigidify the arm 1 in such clamped relation with the nut, strengthening ribs 8 are provided at the junction of said arm with the adjacent connecting or web portion 5.

Assembly of the nut with the nut holder is facilitated by the outwardly tapered guide surface 7 on the top arm 1 in that the end face of the nut, on being initially applied, engages said guide surface 7 in a camming action to cause the same to spread apart from the arm or base 42 as necessary to admit the nut between said arms to the assembled relation of the nut with the nut holder, whereupon the shoulder 6 snaps into engagement with the adjacent end face of the nut.

The nut carrying portion includes a highly advantageous arrangement for providing the nut with the equivalent of a spring locking washer and this is accomplished by means of a longitudinally bowed or arched base on the nut carrying arm 42. Preferably said arm or base 42 is provided without side flanges or other rigid elements which would interfere with the resilient spring action afforded by the curved or arched formation of said base. To this end, there are employed spaced nut retaining abutments 43 which have no effect on the spring action of the arched base 42 and these elements are readily provided by simple slits in said arched base 42 with the material adjacent said slits formed into protuberances in such a way that the slit edge of a protuberance defines a sharp abutment for engaging the adjacent end face of the nut N, Fig. 2. Downwardly bent side flanges 45 on the top arm 1 hold the nut against lateral displacement from assembled relation in the nut holder while the shoulder 6 on the free end of said top arm 1 cooperates with the aforesaid abutments 43 to retain the nut against endwise displacement or removal. The arrangement, otherwise, is such that when a bolt 26 is applied and tightened the resilient arched base 42 is flattened by the clamping face of the nut N to serve as a washer and also exerts a constant axial or outward force on the clamping face of the nut so that the threads of the nut have a binding, frictional engagement with the threads of the bolt and thereby provide an effective thread lock which prevents loosening of the bolt from tightened fastening position.

Figure 2:
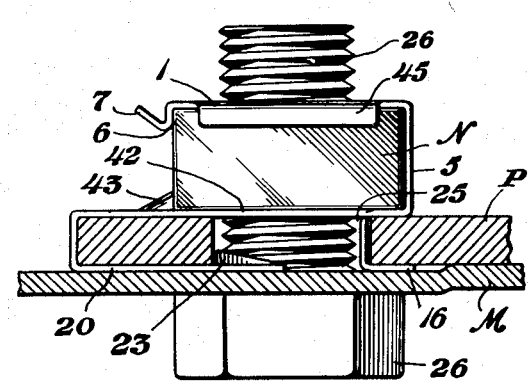

In providing the bolt passage 4, Fig. 1, in the arm 42 of the nut holder, the metal in this area is cut out except for an integral strip which is bent at the periphery of the bolt passage 4 to form a shouldered hook 16 extending in underlying relation to the arm 42 and spaced therefrom a distance approximating the thickness of the part P to which the nut holder is to be attached. The hook 16 is suitably designed in the completed nut holder to pass through the bolt aperture 25 in the supporting part P, and to cooperate with the attaching arm 20 of the nut holder in supporting the nut holder on said part at spaced points, as seen in Fig. 2, so that the attachment of the nut holder to the supporting part is one of high strength and rigidity.

The attaching arm 20 of the nut holder is formed by a generally U-shaped return bend of an end portion on the intermediate arm or base 42 and terminates substantially below the bolt passage 4 therein. The extremity of the attaching arm 20, is recessed in a manner to define a suitable sight opening and an adjacent locking projection or detent 23. Preferably, said detent 23 is formed to define a generally semicircular indexing or position element which snugly engages the periphery of the bolt opening 25 in part P to retain the assembled nut and nut holder in attached position thereon. The locking detent 23 preferably has its upper edge surface tapered generally downwardly and outwardly toward the free end of arm 20 to define an inclined cam surface which provides a flared opening between said arm 20 and the cooperating intermediate arm or base 42.

With the assembled nut and nut holder provided substantially as aforesaid, the attaching arm 20 is adapted to be applied over an edge of part P to a position in which the nut holder retains the nut N in registration with the bolt opening 25 in said part. In the initial application of the nut holder, the hook 16 passes over the part P on the side opposite to that at which the attaching arm 20 is disposed, and as the nut holder is pushed forwardly, said hook 16 is received in the bolt opening 25 and is adapted to extend therethrough to the same side of the part P which is engaged by the attaching arm 20. Thus, when the nut holder is pushed to its fully attached position, shown in Fig. 2, the hook 16 engages the marginal portion of part P adjacent the bolt opening 25 and cooperates with the attaching arm 20 in supporting the nut holder in such fully attached position.

Preferably, the normal spacing of the resilient attaching arm 20 from cooperating intermediate arm 42 is somewhat less than the thickness of part P such that said attaching arm 20 must be spread slightly outwardly over the edge of said part. In this respect, the inclined cam surface of the locking detent 23 defines a flared entrance at the leading end of the attaching arm 20 which facilitates the initial application thereof to part P by causing a gradual outward camming of said arm as necessary to clear the edge of said part P easily and quickly. In such initially applied position, the sight opening adjacent the locking detent 23 leaves the bolt passage 25 in part P uncovered and fully visible such that the attaching arm of the nut holder may be guided readily, in the least amount of time and effort, to the proper attaching position in which the locking detent 23 thereon will snap into said bolt opening 25 in the final applied fastening position of the nut on said part P. The locking detent 23 is preferably semicircular, and thereby snugly engages a material edge portion of the circular bolt opening 25 to lock the nut holder in fully attached position, while otherwise leaving a sufficiently large passage for receiving any suitable bolt fastener 26, Fig. 2, to be applied to the nut N to secure a member M to said part P in a completed fastening installation.

The nut holder is applied to attached fastening position and functions in such attached fastening position substantially in the manner described whether the nut N is preassembled therewith or snapped into assembled relation with the nut holder after the nut holder has been first attached to the supporting part P, as aforesaid.

In any form of the invention, it will be appreciated that in the fully attached position of the nut holder, the shoulder on the supporting hook 16, Fig. 2, abuts a marginal portion of the bolt opening 25 to prevent shifting of the nut holder over said opening while the free end of said hook 16 grippingly engages the part P adjacent said opening in cooperation with the attaching arm 20. The nut holder is thus secured over the bolt opening at spaced points which provides an exceptionally strong attachment. The hook 16 otherwise removes any tendency toward displacement of the nut and nut carrying arm or base 42 from attached fastening position as a result of possible hinging of said nut carrying arm 42 away from the part P, as might be the case when the attaching arm 20 only is employed without the benefit of said supporting hook 16. In addition, the detent 23, on the attaching arm 20 serves to lock the nut holder in attached position, as aforesaid, and accordingly, the various described securing and attaching elements all cooperate in providing an improved, highly practical nut holder which may be attached in a minimum of time and effort to provide a strong, durable and locked installation of the nut and nut holder in attached position on the part to be secured. In such attached position of the nut and nut holder, the arm or base 42 is in its upwardly arched normally untensioned relation, and when the bolt 26 is applied and tightened, said arched base 42 is flattened by the clamping face of the nut to serve as a washer and also exerts a constant axial or outward force on the clamping face of the nut so that the threads of the nut have a binding, frictional engagement with the threads of the bolt and thereby provide an effective lock which prevents loosening of the bolt from tightened fastening position.

Figure 3:
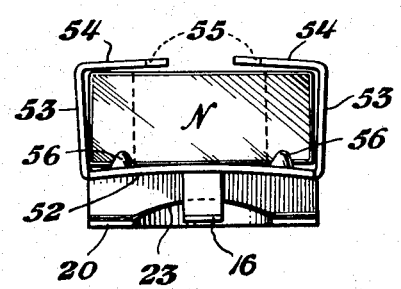
Fig. 3 is an end elevational view of another form of nut holder having an arched base and resilient bolt engaging elements for providing a thread locking action on the bolt.
Figure 4:
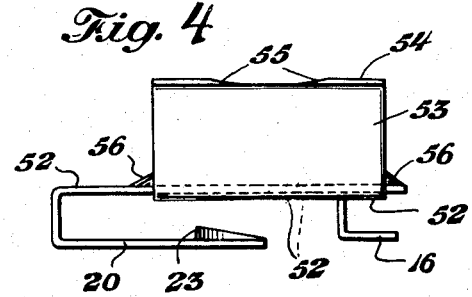
Fig. 4 is a side elevational view of the nut holder shown in Fig. 3.
Figure 5:
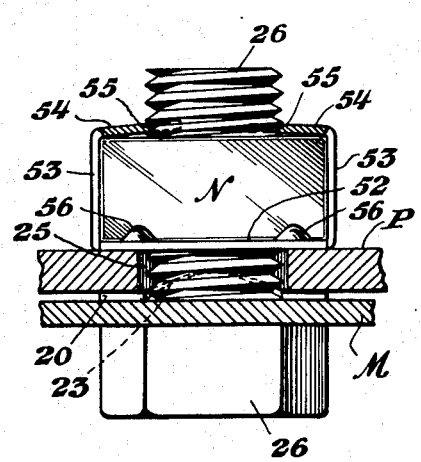
Fig. 5 is a sectional view of an installation in which the nut holder of Figs. 3 and 4 is seen in end elevation in the assembly, and illustrates the bolt locking action provided by this form of nut holder; and, Fig. 6 is a top plan view of Fig. 5.
Figure 6:
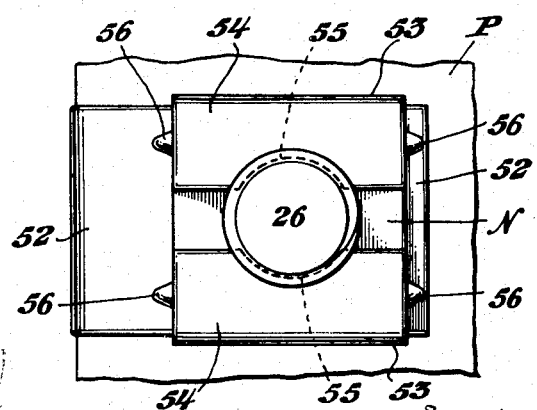

Figs. 3-6, inclusive, disclose a related type of nut holder which includes means for providing a locking action on the bolt in tightened fastening position in a manner equivalent to that just described. This form of the invention is generally similar to that of Figs. 1 and 2 as respects the attaching means comprising the return bent attaching arm 20 and the auxiliary supporting hook 16 depending from the base or nut supporting arm 52 of the nut holder. Said arm 52 is bowed or arched generally transversely as best seen in Fig. 3, and includes upwardly bent side walls 53 which engage the side faces of the nut N, and inturned flanges 54 extending over the top of the nut to retain the same in assembled relation in the nut holder. The extremities of said inturned flanges 54 terminate in arcuate thread engaging portions 55 conforming to the thread convolution on the bolt 26 for threadedly engaging the same, as shown in Figs. 5 and 6. The arched base or nut carrying arm 52 of the nut holder is provided with spaced abutments 56 for engaging opposite end faces of the nut and thereby cooperate with the side walls 53 and top flanges 54 in holding the nut N in assembled relation with the nut holder. Preferably said abutments 56 are formed by protuberances pressed out of the plane of the arm 52 adjacent slits therein, as described with reference to the embodiment of Figs. 1 and 2, inasmuch as such spaced individual abutments do not interfere with the resilient spring action of the arched or bowed base 52 of the nut holder. In the normal untensioned relation of the nut holder, as shown in Figs. 3 and 4, the hook 16 depends from the arched base 52 a slightly less distance than the general plane of the attaching arm 20 so that when the arched base 52 is flattened on application of the nut holder to attached position, said hook 16 extends in substantially the same plane as said attaching arm 20, and consequently, has the same general function as in the previously described form of the invention.

In the application and use of this form of nut holder in an installation such as shown in Fig. 5, the nut holder is attached in the manner described with reference to Figs. 1 and 2. When the bolt 26 is applied and tightened, the resilient arched base 52 is flattened by the nut to serve as a washer and also exerts a constant outward force on the clamping face of the nut so that the thread convolutions in the nut have a binding, frictional engagement with the thread convolutions on the bolt and thereby provide an effective lock which prevents loosening of the bolt from tightened fastening position in this respect.

Flattening of the arched base 52 forces the side walls 53 of the nut holder, Fig. 3, inwardly into contact with the side faces of the nut N as seen in Fig. 5, and simultaneously, the top flanges 54 carried by said side walls 53, are urged inwardly toward each other such that the arcuate thread portions 55 thereon slightly overhang the thread opening in the nut N. As the bolt 26 passes through the nut to tightened fastening position, the leading end of the bolt spreads said arcuate thread portions 55 apart as necessary for the bolt to pass therebetween in uniform threaded engagement therewith as seen in Figs. 5 and 6. The action is such that said arcuate thread portions 55 exert a constant gripping action on the bolt thread under spring tension to provide an automatic thread lock on the bolt which prevents loosening or reverse turning of the bolt from tightened fastening position. This thread locking action together with that effected by the arched base 52 of the nut holder, as aforesaid, provides an installation in which the bolt is securely locked against loosening under the most severe conditions of vibration or shock.

While the invention has been described in detail with specific examples, such examples are intended as illustrations only inasmuch as the invention fully contemplates various modifications which may be provided without departing from the spirit and scope of the invention.

What is claimed is:

1. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm provided with an opening which registers with the bolt passage in the nut and having an arched formation for resiliently supporting the nut so as to produce a thread locking action of the thread surfaces of the nut with the thread surfaces of a bolt threaded into said nut, and means on said nut carrying arm for engaging the top of the nut to retain the nut thereon including portions for engaging opposite faces of the nut, and abutments on said nut carrying arm for engaging another face of said nut.

2. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm provided with an opening which registers with the bolt passage in the nut and having an arched formation for resiliently supporting the nut so as to produce a thread locking action of the thread surfaces of the nut with the thread surfaces of a bolt threaded into said nut, a hook depending from the edge of said opening and extending in the same general direction as said attaching arm to engage a marginal portion of the aperture in said part in cooperation with said attaching arm, and means on said nut carrying arm for retaining a nut thereon.

3. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm provided with an opening which registers with the bolt passage in the nut and having an arched formation for resiliently supporting the nut so as to produce a thread locking action of the thread surfaces of the nut with the thread surfaces of a bolt threaded into said nut, a hook depending from the edge of said opening and extending in the same general direction of said attaching arm to engage a marginal portion of the aperture in said part in cooperation with said attaching arm, and means on said nut carrying arm for engaging the top of the nut to retain the nut thereon including a portion for engaging a side face of the nut, and an abutment on said nut carrying arm for engaging another face of said nut.

4. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm having an arched base and an opening which registers with the bolt passage in the nut, said arched base resiliently supporting said nut so as to produce a thread locking action of the thread surfaces of the nut with the thread surfaces of a bolt threaded into said nut, a hook adjacent said opening extending in the same general direction as said attaching arm to engage a marginal portion of the aperture in said part in cooperation with said attaching arm, and means on the nut carrying arm for retaining a nut thereon comprising a return bent arm for engaging the top of the nut and side flanges on said return bent arm for engaging side faces of the nut.

5. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein and including a projection receivable in said aperture to lock the fastener in attached position, the other arm being a nut carrying arm having an arched base and an opening which registers with the bolt passage in the nut, said arched base resiliently supporting said nut so as to produce a thread locking action of the thread surfaces of the nut with the thread surfaces of a bolt threaded into said nut, a hook adjacent said opening extending in the same general direction as said attaching arm to engage a marginal portion of the aperture in said part in cooperation with said attaching arm and said projection thereon, and means on the nut carrying arm for retaining a nut thereon comprising a return bent arm for engaging the top of the nut, side flanges on said return bent arm for engaging side faces of the nut, and abutments on said nut carrying arm for engaging another face of said nut in cooperation with said side flanges.

6. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm having an opening which registers with the bolt passage in the nut and a hook adjacent said opening extending in the same general direction as said attaching arm to engage a marginal portion of the aperture in said part in cooperation with said attaching arm, and means on the nut carrying arm for retaining a nut thereon comprising integral abutments for engaging side faces of the nut, side walls for engaging other side faces of the nut, and opposing return bent flanges extending from said side walls for engaging the top of the nut the extremities of said return bent flanges being adapted to engage a bolt passing through said nut to provide a locking action on said bolt.

7. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm having an arched base and an opening which registers with the bolt passage in the nut, said arched base resiliently supporting said nut so as to produce a thread locking action of the thread surfaces of the nut with the thread surfaces of a bolt threaded into said nut, a hook adjacent said opening extending in the same general direction as said attaching arm to engage a marginal portion of the aperture in said part in cooperation with said attaching arm, and means on the nut carrying arm for retaining a nut thereon comprising integral abutments for engaging side faces of the nut, side walls for engaging other side faces of the nut, and opposing return bent flanges extending from said side walls for engaging the top of the nut.

8. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm having an arched base and an opening which registers with the bolt passage in the nut, said arched base resiliently supporting said nut so as to produce a thread locking action of the thread surfaces of the nut with the thread surfaces of a bolt threaded into said nut, a hook adjacent said opening extending in the same general direction as said attaching arm to engage a marginal portion of the aperture in said part in cooperation with said attaching arm, and means on the nut carrying arm for retaining a nut thereon comprising integral abutments for engaging side faces of the nut, side walls for engaging other side faces of the nut, return bent flanges extending from said side walls for engaging the top of the nut, and arcuate thread portions on the extremities of said flanges for threadedly engaging a bolt threaded into the nut to provide a thread locking action thereon.

9. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein, the other arm being a nut carrying arm having an arched base and an opening which registers with the bolt passage in the nut, said arched base resiliently supporting said nut so as to produce a thread locking action of the thread surfaces of the nut with the thread surfaces of a bolt threaded into said nut, a hook adjacent said opening extending in the same general direction as said attaching arm to engage a marginal portion of the aperture in said part in cooperation with said attaching arm, and means on the nut carrying arm for engaging the side faces of a nut comprising integral abutments stamped from said arched base and side walls bent generally normal to said base, inwardly bent flanges on said side walls for engaging the top of the nut, and arcuate thread portions on the extremities of said inwardly bent flanges for threadedly engaging a bolt threaded into the nut to provide a thread locking action thereon.

10. A fastener comprising a sheet metal body bent to define a pair of arms extending in the same general direction and adapted to clasp an apertured part therebetween to hold the fastener in fastening position thereon, one of said arms defining an attaching arm for engaging said part adjacent the aperture therein and including a projection receivable in said aperture to lock the fastener in attached position, the other arm being a nut carrying arm having an opening which registers with the bolt passage in the nut and a hook adjacent said opening extending in the same general direction as said attaching arm to engage a marginal portion of the aperture in said part in cooperation with said attaching arm and said projection thereon, and means on the nut carrying arm for retaining a nut thereon comprising integral abutments for engaging side faces of the nut, side walls for engaging other side faces of the nut, return bent flanges extending from said side walls for engaging the top of the nut, and arcuate thread portions on the extremities of said flanges for threadedly engaging a bolt threaded into the nut to provide a thread locking action thereon.

GEORGE A. TINNERMAN.

REFERENCES CITED

The following references are of record in the file of this patent:

UNITED STATES PATENTS

| Number | Name | Date |
| --- | --- | --- |
| 1,198,271 | Price | Sept. 12, 1916 |
| 2,079,917 | Mitchel | May 11, 1937 |
| 2,274,014 | Tinnerman | Feb. 24, 1942 |
| 2,413,669 | Whitcombe | Dec. 31, 1946 |
| 2,552,499 | Tinnerman | May 8, 1951 |

FOREIGN PATENTS

| Number | Country | Date |
| --- | --- | --- |
| 208,601 | Switzerland | Feb. 15, 1940 |